United States Patent [19]

Boe

[11] Patent Number: 4,568,821
[45] Date of Patent: Feb. 4, 1984

[54] REMOTE WATER HEATER CONTROLLER

[75] Inventor: Petter O. Boe, Martinsburg, W. Va.

[73] Assignee: PBA Inc., Hedgesville, W. Va.

[21] Appl. No.: 601,099

[22] Filed: Apr. 17, 1984

Related U.S. Application Data

[63] Continuation of Ser. No. 391,028, Jun. 22, 1982, abandoned.

[51] Int. Cl.[4] .............................................. H05B 1/02
[52] U.S. Cl. ..................................... 219/419; 219/328; 219/330; 219/497; 219/508; 340/870.17
[58] Field of Search ............... 219/328, 329, 330, 331, 219/334, 279, 314, 492, 506, 491, 493; 236/46 R, 46 C; 340/147 R, 147 CN, 870.17; 126/416, 427, 437

[56] References Cited

U.S. PATENT DOCUMENTS

| | | | |
|---|---|---|---|
| 2,058,769 | 10/1936 | Brown | 219/328 |
| 3,672,444 | 6/1972 | Lowe | 165/39 |
| 3,989,928 | 11/1976 | Scragg et al. | 219/334 |
| 3,994,276 | 11/1976 | Pulver | 126/270 |
| 4,016,402 | 4/1977 | Scott | 219/334 |
| 4,044,949 | 8/1977 | Morawetz et al. | 219/279 |
| 4,052,000 | 10/1977 | Honikman | 237/1 A |
| 4,134,544 | 4/1979 | Thomason et al. | 237/1 A |
| 4,165,732 | 8/1979 | Morin | 126/419 |
| 4,261,332 | 4/1981 | Stewart | 126/420 |
| 4,317,987 | 3/1982 | Fieldman | 219/506 |
| 4,337,388 | 6/1982 | July | 219/328 |
| 4,348,582 | 9/1982 | Budek | 219/483 |
| 4,371,779 | 2/1983 | Maynard et al. | 219/328 |

OTHER PUBLICATIONS

Sales Brochure for Model 79D Digital Temperature Display, JBJ Controls, ID. Falls, Idaho.
Sales Brochure for the "Little Gray Box", Intermatic Inc., Spring Grove, Ill.

Primary Examiner—M. H. Paschall
Attorney, Agent, or Firm—Morgan, Finnegan, Pine, Foley & Lee

[57] ABSTRACT

An apparatus and method for controlling a domestic hot water heater system in which the actual temperature of the water in the storage tank of the system is continuously measured and the measured water temperature is continuously displayed at a location remote from the water heater. There are control means located at a remote location for actuating energizing means at the water heater for heating the water. The energizing means is actuated by the person intending to use the heated water on the basis of the measured temperature of the water displayed at the continuous display at the time of measurement and the intended use of the water.

28 Claims, 6 Drawing Figures

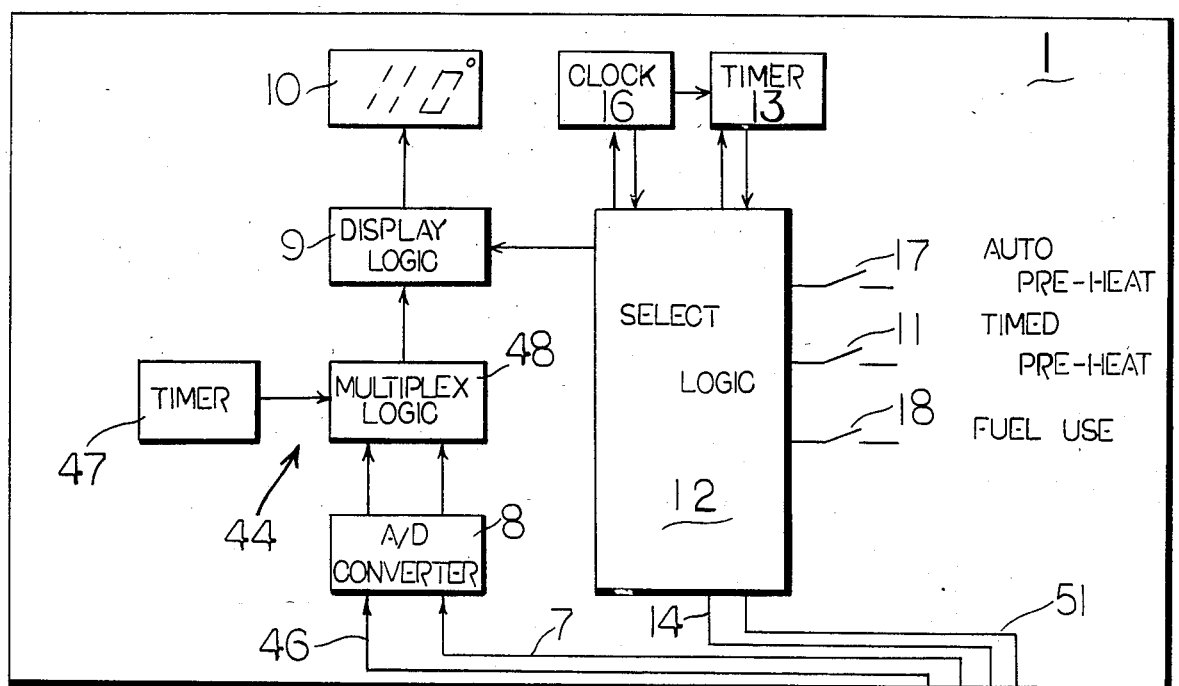
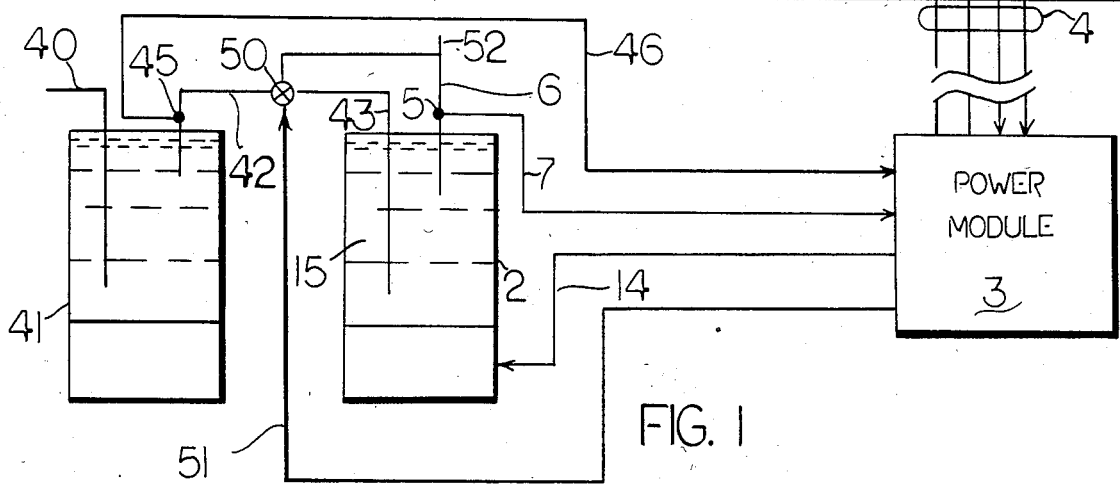
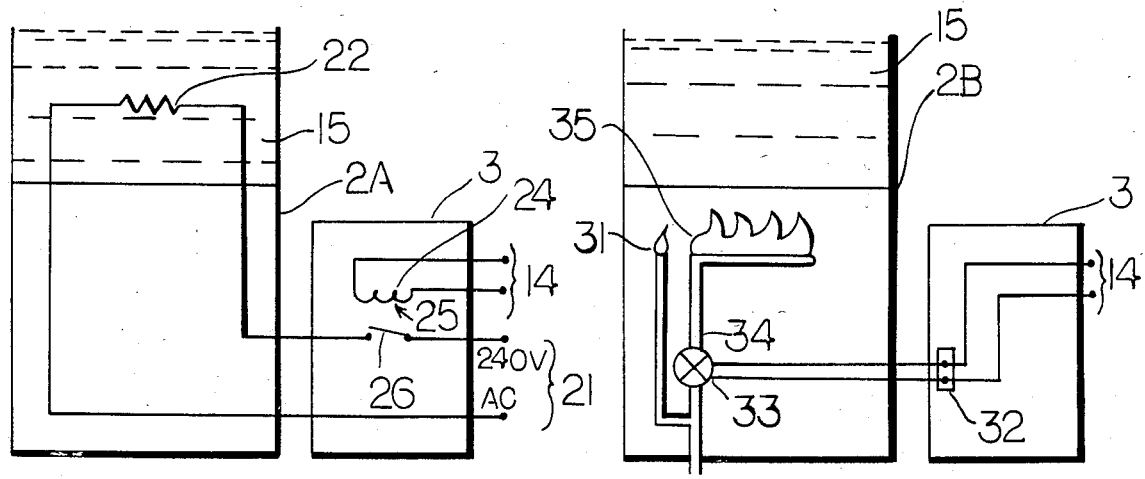
FIG. 1
FIG. 2
FIG. 3

REMOTE WATER HEATER CONTROLLER

This is a continuation, of application Ser. No. 391,028 filed June 22, 1982 now abandoned.

BACKGROUND OF INVENTION

The invention relates to water heating system controllers and more particularly to an electronic water heating system controller which allows a user to remotely control the operation of any water heating system, whether it is fueled by electricity, gas, oil or solar power. The controller displays the temperature of the water stored in the water heating system, providing the user with the necessary information to select an operating mode of the controller which will satisfy his particular hot water needs.

Virtually all domestic hot water heating systems in use in the United States today are customarily on at all times, controlled only by a thermostat mounted on the outer housing of the water heater. The thermostat cycles the heating system on and off to maintain the water stored within the system at a temperature near the setting of the thermostat. Although this arrangement is convenient in that it provides constantly available hot water, it results in a large waste of energy. In fact, out of the "normal" energy consumption for the typical American home, the domestic hot water heater is consistently the largest single energy user after space heating, typically accounting for 400 to 600 KWH/month, or about half of the non-space heating monthly energy bill.

In recent years, because of the energy crises which the United States has experienced, several commonly accepted conservation measures have been widely recommended to minimize the energy consumption of such water heating systems. Although fuel prices vary by type and geography, such measures have generally included adding insulation to water heater tanks, lowering the temperatures setting of the thermostat mounted on the outer housing of the water heater, adding pipe insulation to hot water pipes, and placing clock timers for cycling such systems on and off at specific times of the day (particularly where time of day electric rates are in effect) to save energy during those periods of time that the system is not normally used.

While these measures can generally result in energy savings they either do not directly address the main cause of the quantity of energy consumed by water heating systems, or if such cause is addressed, the "solution" does not compare with the level of convenience available to a user with a water heater that is customarily on at all times, nor does it maximize energy conservation.

I have found that a substantial portion of the energy consumed by an average water heating system can be due to "stand by losses", i.e., the amount of heat loss which occurs in a system that is not being used but which nonetheless maintains hot water at a preset temperature at all times for convenience sake. Because the hot water stored in the system's water storage tank is not used, it loses heat at a rate which is dependent upon the actual tank temperature versus the ambient temperature and the "R" value of the insulation surrounding the tank. The higher the difference between the two temperatures, and/or the lower the "R" value, the higher the rate of heat loss. Most of this heat loss occurs through the top of the water storage tank of the system so that over time a temperature stratification of the water stored in the tank occurs, i.e., the water at the top of the tank will be the hottest, while the water at the bottom will be the coldest. As the hot water in the tank loses heat, the system utilizes energy that is not put to any productive use except to heat the stored water to provide the convenience of having constantly available hot water.

From this, it can be concluded that if the hot water in the tank is not used for extended periods of time, but is simply maintained at the set temperature, stand-by losses will account for all of the energy consumption of the appliance.

I have also found that contrary to several often cited studies of average hot water use in the home, most homes do not use a small steady flow of hot water during the day with a usage peak once a day. Rather, patterns are erratic from home to home, with each home having a four to six-hour period or longer during which no hot water is used at all. If such non-use is coupled with the non-use which occurs overnight, it can be seen that stand-by losses account for a substantial portion of the average water heating system's total energy consumption.

Standby losses can also result in the inefficient operation of water heating systems using a solar preheat tank. On the assumption that standby losses are small percentage of domestic hot water energy consumption, most currently available domestic solar hot water systems are designed as two tank systems. Cold supply water is preheated in a separate preheat tank connected to solar collectors before it is added to the conventionally fueled hot water heater.

The problem with using such systems for energy conservation is that most are designed such that a user is incapable of determining whether the hot water being drawn has been heated in the solar preheat tank or in the water heater tank heated by conventional fuel such as gas, oil or electricity. If a given conventional system can experience losses as a large proportion of its total energy consumption when idle for extended periods of time, then it follows that the solar preheat tank of a solar two tank system can also experience a high level of standby losses during similar periods of time. And if these losses occur overnight when solar energy cannot replenish such losses, and if the peak usage for hot water from such system occurs in the early morning hours, it is possible that a prefectly operating and otherwise efficiently designed solar two tank preheat system will actually not supply an appreciable amount of useable solar energy so as to provide any appreciable energy savings.

One solution to the problem of stand-by losses has been the use of automatic clock timers to turn water heating systems on automatically during periods when the appliance is expected to be used and to turn the system off at times when it is expected that the appliance will remain idle. Appliance controls and timers have been designed to be installed as close to the water heating system as possible. This is because most hot water heaters are powered by 240 volts ac and range in power from 1,000 to 5,500 watts, if electric, and if gas, they require a fairly substantial gas conduit. Thus, these requirements place severe limitations upon the distance from the appliance that such control switching can be performed. The practice of placing such timers near the water heating system compromises the convenience provided because it is usually necessary for a user to go to a remote location such as a basement to change the settings of the timer. Thus, common practice is to set such clock timers for very limited, universally acceptable off periods, e.g., midnight to 5:00 A.M., with the balance of the 24 hour period being used to keep the water heater on for the sake of convenience. Thus, such timers are not very energy efficient because they generally require a water heating system to operate for long periods during the day when no hot water is needed merely for the sake of convenience, resulting in unnecessary energy consumption due to standby losses.

SUMMARY OF THE INVENTION

Accordingly, it is an object of the present invention to provide a water heater controller which provides virtually the same level of convenience in providing hot water as a water heater that is customarily on at all times, while providing a substantial amount of energy savings. Another object of the present invention is to provide a water heater controller which displays the temperature of the water stored in the tank of the water heating system to allow the user to use such water temperature information to flexibly control the operation of the water heating system to meet the user's hot water needs in a manner that permits maximum energy conservation with a minimum of degradation in convenience vis-a-vis availability of hot water. A further object of the present invention is to provide an electronic water heater controller which provides such flexible control through a plurality of operating modes, and which can be located anywhere in the residence of the user for convenience of operation. Another object of the present invention is to provide a water heater controller which can also display the temperature in the solar preheat tank of a two-tank solar system, to allow a user to choose to continue to use water directly from the solar preheat tank or to bypass such tank when the water therein is not hot enough to meet the user's needs and operate the conventionally fueled water heater in a manner that will still conserve energy while meeting such needs.

My invention is a remote water heater controller which utilizes solid state electronics to produce a device which is inexpensive, yet flexible in its operating capabilities. Although the following discussion is specifically directed toward the control of water heaters, it is to be understood that the phrase "water heaters" also includes water heating systems such as oil furnace water heaters and air to water heat pumps which are electrically controlled.

The controller consists of two modules, a control console and a power control module. The control console allows a user to operate an associated water heater in a plurality of operating modes, i.e., automatic preheat, timed preheat and full use. In the automatic preheat mode the water heater is cycled on automatically at a pre-selected hour for a pre-selected period of time every day. In the timed preheat mode the water heater is cycled on on command for a selected period of time, while in the full use mode the water heater operates continuously. These operating modes provide a user with the opportunity to save substantial energy by cycling his water heater on only when needed. This affords the user a flexibility of control that provides a level of convenience comparable to that provided by water heating systems which are constantly operating, while allowing the user to avoid the large amount of energy consumption required by such constantly operating systems.

To aid a user in the selection of an appropriate operating mode the control console provides a display of the temperature of the water stored in the water heater tank. The temperature is sensed through a temperature sensor which is attached to the hot water outlet pipe located at the top of the water heater. Depending upon a user's hot water needs, and upon the temperature being displayed, a user will select one of the operating modes provided, whereupon the control console either energizes the water heater to allow it to produce more hot water, or he will determine that sufficient hot water is present in the storage tank for his needs, whereupon he will either not energize the water heater, or de-energize it if it was previously operating.

The combination of the temperature display and the plurality of operating modes provided by the controller of my invention allows any user to take advantage of the temperature stratification which occurs over time in the water storage tank of a water heating system so as to minimize the energy consumption of such system. The various operating modes allow a user to operate the water heater in accordance with the user's particular schedule and hot water needs. The controller allows a water heater to be turned off for extended periods of time when no hot water is needed to save energy. Yet, if a user later needs or desires hot water, the water temperature information provided by the display of the controller allows the user to determine whether the hot water present at the top of the water storage tank due to stratification will be sufficient to meet his hot water needs. If not, the controller allows the user to immediately and conveniently heat additional water to satisfy his needs. I have found that the hot water available in a storage tank after a heater has been idle for four to six hours will often be sufficient to meet limited hot water needs arising later in the day, requiring a user of my invention to turn his water heater on only for small periods of time each day (e.g. one to two hours each morning), depending upon one's needs and the condition of the water heater, to meet his total hot water needs for the day. Thus, through experience, a user can learn to use the flexibility of control provided by my controller to efficiently satisfy his hot water needs by heating only that amount of water, either in advance or on command, that will be used, and no more, thereby achieving minimum water heater on time. The result is that maximum energy conservation can be achieved with the very least degradation of convenience in the availability of hot water.

The power control module of my invention contains the means for energizing and de-energizing the water heater in response to commands from the control console. Its construction will vary, depending upon the type of water heater being controlled.

The water heater controller of my invention is also provided with means for interconnecting the power control module, which is mounted near or on a water heater, and the control console, which is placed remotely from the water heater, to allow a user to conveniently control the water heater from such locations as a kitchen or a bathroom. It should be noted that there may be more than one control console throughout a house to allow a user the convenience of controlling the water heater from a number of locations.

In an alternative embodiment of my invention, the control console can also be provided with means for controlling the flow of water from a solar two tank system normally providing water from a solar preheat tank and using a conventional water heater for backup, to optimize the operation of such a system vis-a-vis energy conservation. Under this embodiment the temperature of the water in the preheat tank is also monitored and displayed to determine whether the temperature of the water therein is sufficient to meet a user's needs. If it is not, the control console can be used to divert the flow of water directly from the preheat tank to the conventional water heater for additional heating in accordance with one of the previously mentioned operating modes.

Thus, my invention, while providing virtually the same level of convenience that is achieved with water heaters that are customarily on at all times, provides a user with a remote display of the water temperature in the tank of his water heater to allow the user to remotely control its operation to meet the user's actual hot water needs, thereby allowing the user to turn his water heater off to save energy when no additional hot water is needed.

DESCRIPTION OF THE DRAWINGS

FIG. 1 is an overall block diagram of the electronic water heater controller including the remote control console and the power module used to energize and de-energize conventional and solar/conventional water heaters.

FIG. 2 is a drawing of the interface arrangement between the power module and an electric water heater which is used to energize and de-energize such heater FIG. 3 is a drawing of the interface arrangement between the power module and a gas water heater which is used to energize and de-energize such heater.

DESCRIPTION OF THE PREFERRED EMBODIMENTS

Figure 4:
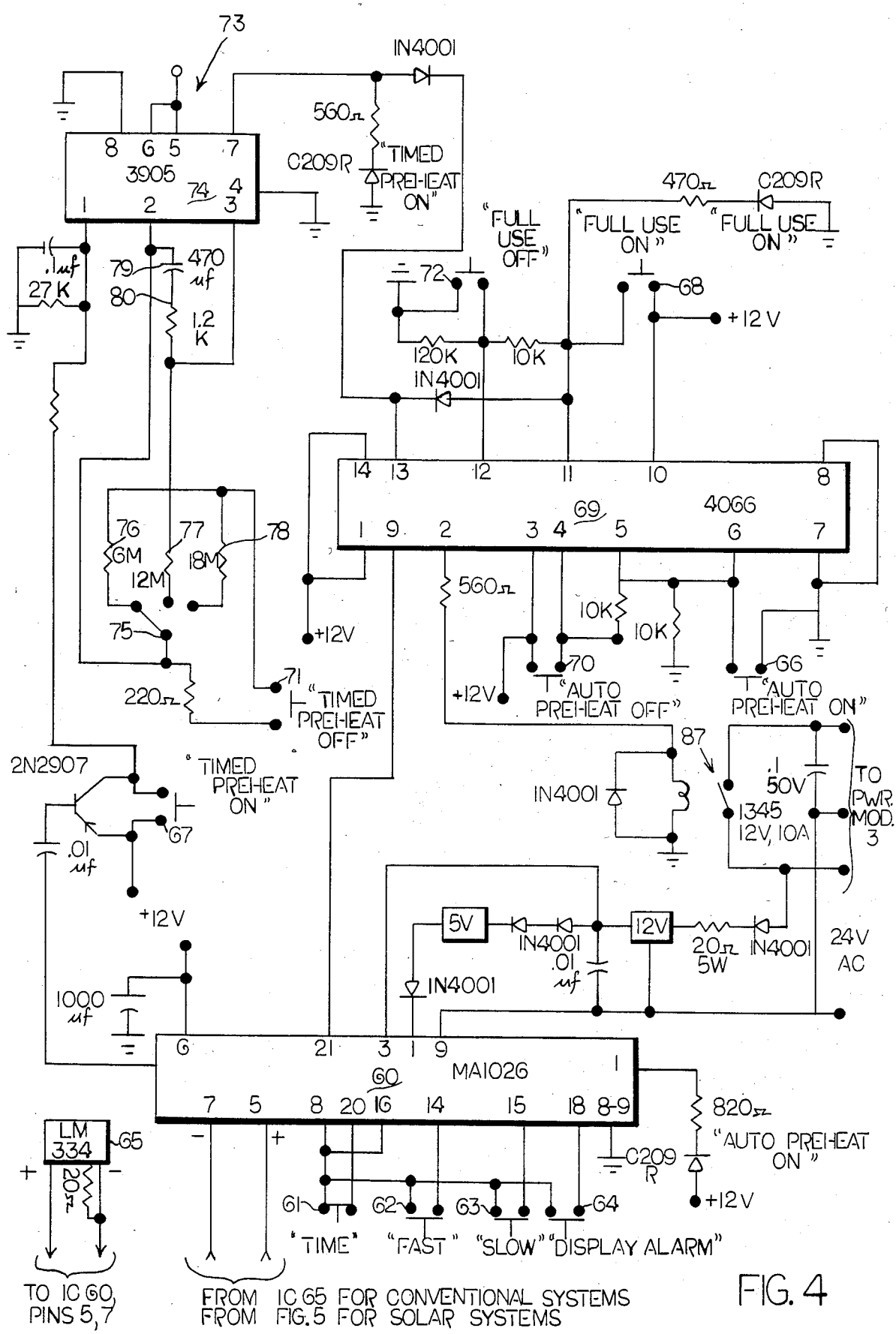
FIG. 4 is a schematic of the best mode circuitry used in the remote control console and the power module to control conventional water heaters.

As noted previously, FIG. 1 is an overall block diagram of the water heater controller showing the interface arrangement between the controller and a conventional water heater. FIG. 1 also discloses those electronic components which are used by the water heater controller to operate a water heater having a solar preheat tank.

Referring to FIG. 1, the water heater controller of the present invention utilizes two modules: a control console 1 located remotely from a water heater 2 and a power module 3 located close to water heater 2 and used to energize and de-energize water heater 2 in accordance with the operating mode selected through control console 1.

To provide convenience for the user of the water heater controller of my invention, the control console 1 and the power module 3 are separated from one another to allow control console 1 to be placed in a convenient location such as a kitchen or bathroom. To implement this arrangement, control console 1 and power module 3 are interconnected by a cable 4 which is long enough to allow control console 1 to be placed up to 200 feet from the location of the water heater.

During normal operation of the water heater controller a temperature sensor 5 is attached to a hot water pipe 6 of water heater 2. Temperature sensor 5 is used to sense the temperature of the water within the water heater. Sensor 5 then generates an electric signal which is proportional to the temperature measured by it. This signal is transmitted to the control console 1 along wire pair 7 through power module 3 and cable 4 up to analog to digital converter 8. Analog digital converter 8 then transforms the analog signal generated by sensor 5 into digital form, after which it is formatted by display logic 9 into a format which can be displayed by display 10. Although FIG. 1 shows a multiplexer 48 interrupting the signal path between converter 8 and display logic 9, in this embodiment of my invention there would be a direct connection between converter 8 and display logic 9, with multiplexer 48 being used in the solar embodiment of my invention which is described hereafter.

The water heater controller of the present invention includes three operating modes: (1) timed preheat, (2) automatic preheat and (3) full use. All operating modes are selected by activating the proper switch located on the face plate (not shown) of control console 1.

In the timed preheat mode, whenever temperature display 10 indicates that water heater 2 lacks not water or that the hot water in water heater 2 is insufficiently hot, a user can obtain hot water through the timed preheat mode by activating a switch 11. The activation of switch 11 causes select logic 12 to activate a timer 13 which controls the duration of the preheat function. The activation of timer 13 then causes select logic 12 to generate a turn on signal on wire pair 14 to energize water heater 2 through power module 3, thereby allowing water heater 2 to raise the temperature of the water 15 in its tank to the level set by the temperature thermostat (not shown) on the water heater. Timer 13 can be set for specific periods of time by adjusting a selector (not shown) on the back plate (not shown) of control console 1. Once the preheat mode is selected it will remain activated for the period of time determined by the setting of timer 13. When this period comes to an end, timer 13 will cause select logic 12 to de-energize water heater 2 through power module 3.

For the automatic preheat operating mode, control console 1 contains a 24 hour clock 16. This clock may be set to turn on water heater 2 automatically at any desired hour or hours of the day. The automatic preheat mode is activated at any time by activating switch 17 located on the face plate of control console 1. The closing of switch 17 causes select logic 12 to activate clock 16 so as to allow it to continuously sequence through a 24 hour period, cycling water heater 2 on and off. Under this mode, when clock 16 reaches one of the pre-selected turn-on hours, selected by a switch (not shown) located on the back plate of control console 1, timer 13 causes select logic 12 to generate a turn on signal on wire pair 14 to energize water heater 2 through power module 3, thereby allowing water heater 2 to generate hot water for a time period determined by timer 13.

At any time during which the automatic mode is on, if more hot water is needed than was anticipated, the timed preheat function may be turned on by activating switch 11 temporarily overriding the automatic preheat mode's operation. Similarly, when temperature display 10 indicates that the water temperature in water heater 2 is hot enough, the automatic preheat mode may be turned off by de-activating switch 17. This action will not, however, affect the time settings of the automatic preheat mode, allowing it to be easily selected again for subsequent time periods.

Under the full use or manual operating mode, water heater 2 may be turned on continuously through power module 3 for any desired period of time by activating switch 18 which is also located on the face plate of control console 1. When the full use mode is selected, power module 3 is activated through a turn on signal generated on wire pair 14 by select logic 12, thereby allowing it to turn on water heater 2 to heat water. If the full use mode is turned off, power module 3 is deactivated, thereby causing power module 3 to de-energize water heater 2, which prevents water heater 2 from heating more water. In the full use mode, all other functions are ignored by control console 1. Use of this mode will not affect the other settings and operation of the timed preheat and automatic preheat modes will resume as before when the full use mode is turned off.

The design and operation of power module 3 in energizing or de-energizing a given water heater is different, depending upon the type of water heater which is being controlled.

FIG. 2 represents the operation of power module 3 with respect to an electric water heater 2A. If should be noted, however, that the arrangement disclosed therein may also be used with oil furnace water heaters and air to water heat pumps which are electrically controlled and which have water storage tanks. Electric water heater 2A uses a standard voltage 21 of 240 volts AC in conjunction with electric heater coil 22 to heat the water 15 within the heater 2A. Control console 1 energizes and de-energizes water heater 2A for each of the operating modes by an electric signal on line 14 which when raised or lowered energizes or de-energizes a coil 24 of a relay 25 to allow contacts 26 of relay 25 to connect or interrupt power source 21, depending upon whether water heater 2A is to be activated or deactivated. Of course, relay 24 must be of sufficient size and capacity to carry the necessary current to operate heater 2A. One example of this type of relay is Potter & Brumfield 30-amp relay model no. PRD 11AYO.

FIG. 3 shows the interface arrangement of the water heater controller for gas water heaters. For control of the gas water heater 2B shown in FIG. 3 the water heater controller uses an electro-magnetic solenoid gas valve 33 placed in a gas line 34 after a factory installed electromagnetic safety main gas valve (not shown) which shuts off water heater 2B's gas supply if its pilot light 31 is extinguished. Line 34 feeds water heater 2B's main burner 35 from gas valve 33 which is normally closed when water heater 2B is shut down.

When, in accordance with any of the above three operating modes, water heater 2B is to be energized, valve 33 is opened by energizing relay 87, shown in FIG. 4, which in turn raises an electric signal on wire pair 14 that energizes valve 33 through contacts 32 located in power module 3. The opening of valve 33 allows gas to flow from water heater 2B's main gas valve through valve 33 and line 34 to main burner 35. The gas flowing into burner 35 is then ignited by pilot light 31 which is normally on. The result is that water heater 2B is allowed to heat additional water in accordance with the operating mode selected.

Although not specifically disclosed in FIGS. 2 and 3, for both the interface arrangements for electric and gas water heaters power module 3 would also contain a step-down transformer which would provide the 24 VAC used in the preferred embodiment to power up control console 1, and to switch relay 25, shown in FIG. 2, and solenoid valve 33, shown in FIG. 3.

FIG. 1 also discloses the components utilized in an alternative embodiment of my invention to control water heating systems having two tanks, one of which is conventionally heated by electricity or gas, and the other of which is a solar preheat tank. According to my invention, cold water supplied through pipe 40 is normally heated in solar preheat tank 41 connected to solar collectors (not shown) after which, contrary to normal practice, it is drawn directly into the main hot water supply of the house through preheat pipe 42 and bypass valve 50 to pipe 52. Further, also contrary to normal practice, conventional water heater 2 is normally off unless specifically cycled on through the use of the controller. This arrangement is extremely energy efficient because normally only solar energy is used to meet the hot water needs of the user, unless the water in the solar preheat tank is insufficient for this purpose. The display provided by the controller allows a user to make this determination. If he finds a need for more hot water the conventionally fueled water heater can be cycled on to efficiently meet this need so as to maximize energy conservation.

In accordance with this alternative embodiment, control console 1 is provided with a scanner circuit 44 which causes temperature display 10 to automatically alternate between displaying the temperature in conventional water heater 2 and the temperature in solar preheat tank 41. For this purpose there are provided two sensors, sensor 5 for the conventionally fueled water heater 2 and a second sensor 45 for the solar preheat tank 41. The temperature signal generated by sensor 5 is transmitted along wire triplet 7 through power module 3 to converter 8 of control console 1, while the temperature signal generated by sensor 45 is transmitted along wire triplet 46 through power module 3 to converter 8 of remote control console 1. Both signals are then fed from analog to digital converter 8, which converts the temperature signals from analog form to digital form, to a multiplexer 48 which alternately transmits the signals to display logic 9 which formats the signals for display by display 10.

Scanner circuit 44 contains multiplexer 48 which causes temperature display 10 to automatically alternate between displaying the temperature in conventionally fueled water heater 2 and the temperature in solar preheat tank 41. Scanner circuit 44 is also provided with a timer circuit 47 which controls multiplexer 48. Timer 47 causes multiplexer 48 to switch approximately every 10 seconds between transmitting the temperature signal provided on wire triplet 46 and the temperature signal provided on wire triplet 7 to display logic 9. This arrangement allows display 10 to alternately display the water temperature in conventionally heated water heater 2 and solar preheat tank 41.

It is the use of this dual display which allows a user of the water heater controller to compare the water temperature in the conventional water heater 2 and solar preheat tank 41. If it is determined that the temperature of the water in the solar preheat tank is insufficient for a user's needs, he may choose to use conventional water heater 2 to meet his needs by activating the appropriate operating mode of the controller. The activation of any of switches 11, 17 or 18 causes select logic 12 to activate bypass valve 50 through a signal raised on wire pair 51 of cable 4 and to turn on conventional water heater 2 through wire pair 14 and power module 3. The activation of bypass valve 50 causes the water traveling from solar preheat tank 41 through pipe 42 and valve 50 to pipe 52 to be re-routed through valve 50 to pipe 43 and ultimately to water heater 2 for further heating.

Figure 5:
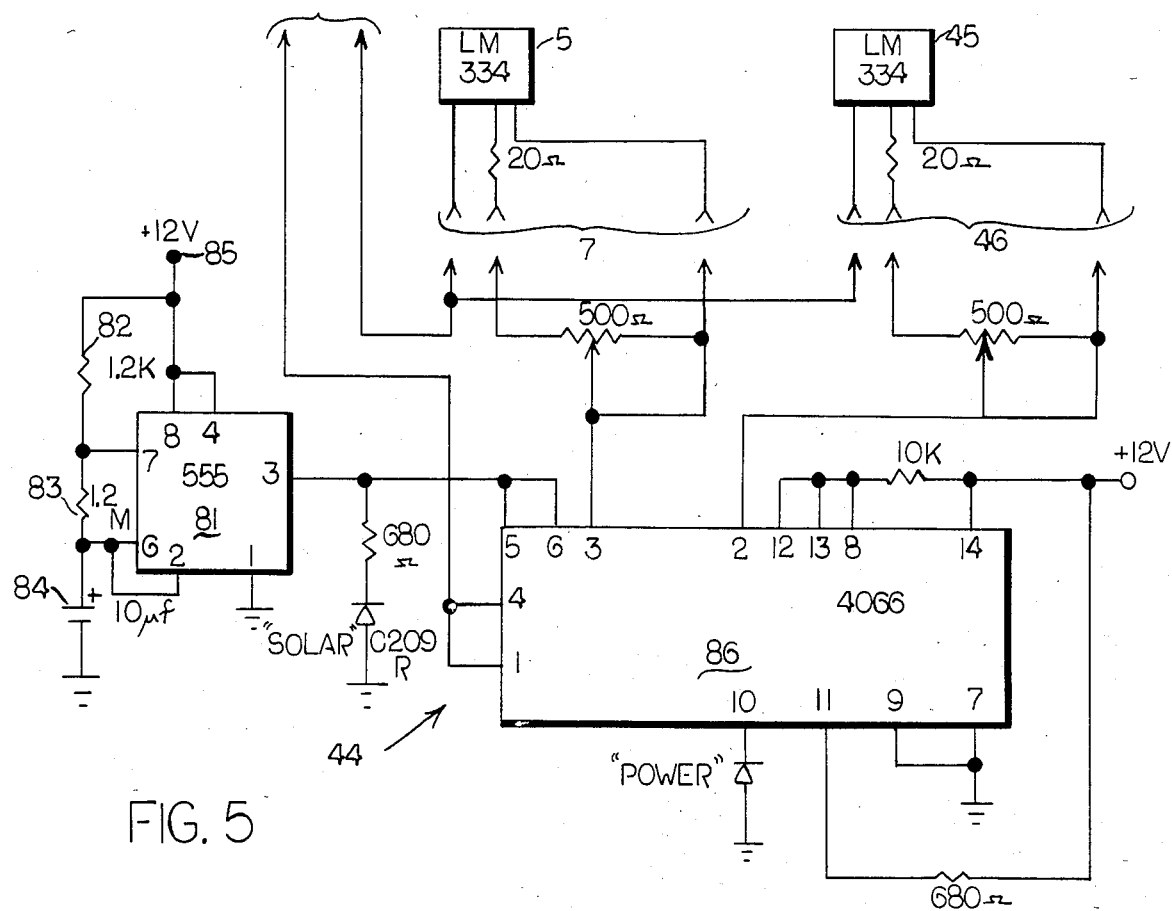
FIG. 5 is a schematic of the best mode circuitry in the remote control console to monitor the water temperature in both the solar pre-heat tank and the conventionally fueled water heater.

FIGS. 4 and 5 are schematics of specific circuit designs used to implement the preferred embodiment of my invention. However, it is to be understood that alternative embodiments which are functionally equivalent to the preferred embodiment disclosed may be substituted therefor.

The design disclosed in FIG. 4 makes substantial use of various integrated circuits to carry out the general functions comprising the block diagram of the invention disclosed in FIG. 1. For example, integrated circuit 60 is a multifunction National Semiconductor device, model No. MA1026, which provides the twenty-four hour clock function, the analog to digital converter and the display and display logic for measuring and displaying the temperature signal provided by the temperature sensors 5 and 45 shown in FIG. 1. Integrated circuit 60 also provides the logic for setting and displaying the settings of the twenty-four hour clock through switches 61, 62, 63 and 64. The functions provided by integrated circuit 60 may of course be provided by alternative electronic components which are functionally equivalent to integrated circuit 60.

Integrated circuit 65 is an example of a remote temperature sensor which carries out the function of sensor 5 of FIG. 1 by sensing temperature as a linear function of voltage or current. This signal is then ultimately transmitted to pins 5 and 7 of integrated circuit 60, which in turn converts the signal to digital form for display. Integrated circuit 65 can be any kind of integrated or discrete circuit which provides an electric signal that is proportional to temperature, one example of an integrated circuit being National Semiconductor model No. LM334 or its equivalent.

The various operating modes of the present invention, i.e., auto preheat, timed preheat and full use are selected by activating one of switches 66, 67 or 68, respectively. Integrated circuit 69 then provides the latching for the operating mode selected to maintain the operation of such mode until it is cancelled by activating one of switches 70, 71 or 72 respectively. For the latching function the preferred embodiment shown in FIG. 4 uses National Semiconductor integrated circuit model no. 4066, although alternative circuit equivalents can be substituted.

For the timed preheat operating mode the duration of such mode is controlled by timer circuit 73. In the preferred embodiment shown timer circuit 73 uses a timer latch integrated circuit 74, National Semiconductor model No. 3905, which is triggered by the clock of integrated circuit 60; again, however, an alternative equivalent circuit can be used. The duration of the preheat mode is selected through slide selector switch 75, used to select one of three resistors 76, 77 or 78 operating in conjunction with capacitor 79 and resistor 80 to generate time periods of one, two or three hours, although it should be understood that other time periods can also be used.

The auto preheat mode is controlled by the twenty-four hour clock of integrated circuit 60 which triggers timer circuit 73 when the pre-selected hour of the day for the operation of such mode is reached. When timer circuit 73 is triggered under this mode it operates in the same manner as in the timed preheat mode, energizing water heater 2 for the pre-selected duration of time, starting at such hour.

For water heating systems having a solar preheat tank FIG. 5 discloses a scanner circuit which allows the water controller to alternately display the temperature of water stored in conventionally fueled water heater tank 2 and the solar preheat tank 41. Integrated circuit 81, National Semiconductor model No. 555, or an equivalent circuit, provides a timing function which allows sensor wires 7 and 46 to be alternately scanned approximately every 10 seconds. The time constant for this circuit is provided by resistors 82 and 83 and capacitor 84. Resistor 82 is connected at one end to the +12 V supply 85 and pins 8 and 4 of integrated circuit 81, and at the other end to resistor 83 and pin 7 of integrated circuit 81, while resistor 83 is connected at one end to pin 7 of integrated circuit 81 and resistor 82, and at the other end to pins 6 and 2 of integrated circuit 81 and capacitor 84, the other end of capacitor 84 being connected to ground.

Integrated circuit 86 of FIG. 5 is a switching latch for scanner circuit 44 which multiplexes the temperature signals from sensor 5 and wires 7 and from sensor 45 and wires 46 to integrated circuit 60 through pins 5 and 7 thereof to allow both temperatures to be alternately displayed. In the preferred embodiment shown in FIG. 5 integrated circuit 86 is also of the type used for integrated circuit 69 of FIG. 1.

Figure 6:
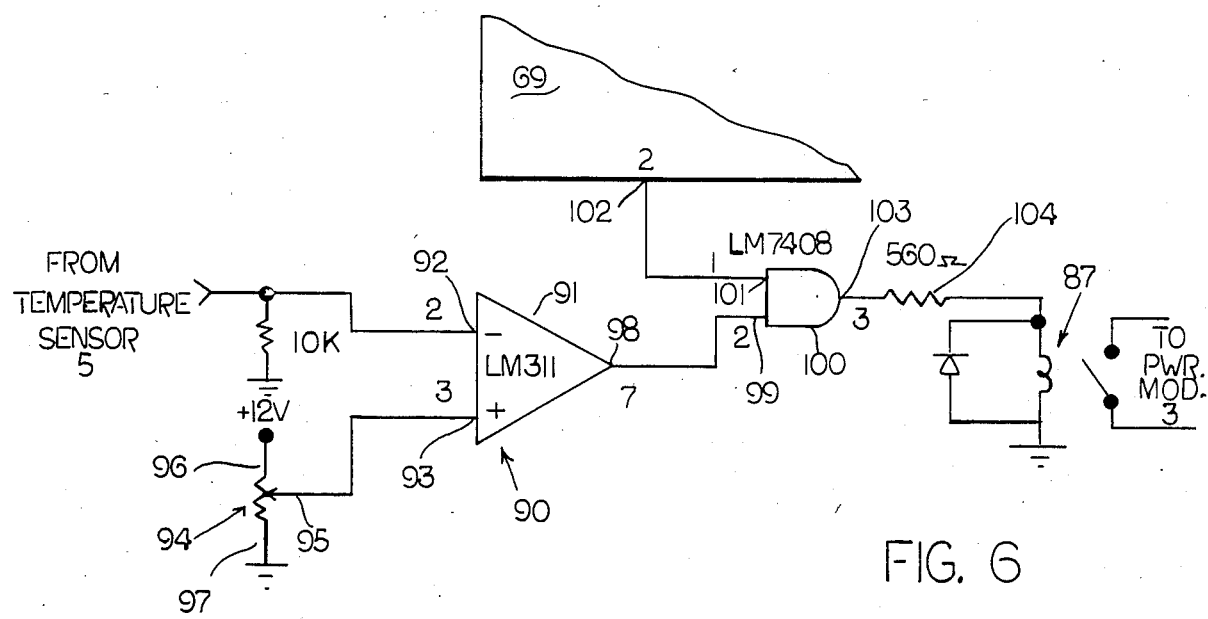
FIG. 6 is a schematic of a circuit for remotely controlling the temperature level to which the water in a water heating system will be heated.

In another alternative embodiment of my invention there can also be provided means for controlling the temperature level to which the water in the storage tank of a water heating system will be heated. As shown in FIG. 6 this function can be implemented through a standard comparator circuit 90 which compares the temperature sensed by temperature sensor 5 to a temperature setting provided by a variable potentiometer, thumbwheel or the like, which is calibrated to provide any desired range of operating temperatures, thereby allowing a user to operate his water heater efficiently at different temperatures for different purposes.

Referring to FIG. 6 comparator circuit 90 is comprised of a variable potentiometer 94, which provides a reference voltage that represents a desired temperature setting, and an integrated circuit comparator 91, which measures this reference voltage through its positive input 93, and compares it to the temperature signal generated by temperature sensor 5, measured by its negative input 92. The reference voltage provided by potentiometer 94 is developed by its wiper arm 95 which is connected to input 93 and which selects various percentages of the voltage potential across arm 96 of potentiometer 94, connected to a positive supply voltage such as +12 V, and arm 97 of potentiometer 94, connected to ground, depending upon the desired temperature setting.

When comparator 91 senses that the temperature signal generated by sensor 5 is below the temperature setting (reference voltage) provided by potentiometer 94 output 98 of comparator 91 will swing to a voltage level which corresponds to a command to cycle on water heater 2. This voltage level is sensed by an input 99 of AND gate 100, which will prevent water heater 2 from being cycled on unless one of the operating modes of the controller is selected.

The selection of any one of these operating modes will cause the output 102 of integrated circuit 69 to rise to a voltage level which also corresponds to a command to cycle on water heater 2. This voltage level is sensed by the other input 101 of AND gate 100, and when both inputs of gate 100 are at voltage levels corresponding to a command to cycle on water heater 2, the output 103 of gate 100 will also swing to a voltage level which corresponds to a cycle on command. This change in output 103 causes relay 87 to be energized by a current flowing through current limiting resistor 104, which in turn causes power module 3 to cycle on water heater 2 to provide the required hot water.

Alternately, if comparator 91 determines that the temperature signal generated by sensor 5 is greater than or equal to the selected temperature setting (reference voltage) of potentiometer 94, water heater 2 will not be cycled on irrespective of which operating mode is selected, until the temperature sensed by sensor 5 falls below the temperature setting of potentiometer 94.

Thus, through the use of this alternative embodiment additional energy savings can be realized in the operation of a water heater. Since the operating temperature of the water heater can be adjusted to meet the specific hot water requirements of various tasks (e.g., washing dishes in a dish washer which requires extremely hot water, versus taking a shower which normally requires only lukewarm water), the wasteful practice of heating water to a certain temperature then cooling it down by mixing it with cold water to make it bearable can be avoided.

It should be understood that the terms and expressions which have been employed to describe my invention are used in a descriptive and not a limiting sense, with no intention of excluding equivalents of the invention described and claimed.

What is claimed is:

1. An electronic water heating system controller for controlling a water heater from a location remote from the water heater comprising:
   (a) a temperature sensor positioned at the top of a water storage tank of the water heating system actually measuring the temperature of water stored at the top of said water storage tank of the water heating system, so that the actual temperature of the hottest water of all water stored in said storage tank is measured,
   (b) means driven by said temperature sensor for displaying at a location remote from said storage tank the actually measured temperature of said hottest water stored at the top of said water storage tank so that a determination of whether sufficient hot water is available for a selected one of a plurality of tasks can be made, said plurality of tasks requiring a plurality of water temperatures for their performance,
   (c) means remote from said storage tank for operating said water heater in a plurality of operating modes,
   (d) means actuated by said operating means for energizing said water heating system in a mode selected from said plurality of operating modes, said energizing means being normally disabled, and
   (e) means interconnecting said temperature sensor with said displaying means at said remote location and interconnecting said energizing means with said operating means, said actual measured temperature display means and said operating means at said remoted location allowing the temperature of the water stored in said system to be controlled from said remote location through the selection of an energizing mode based on the actual measured water temperature of said hottest water stored at the top of said water storage tank displayed at the time the temperature is to be controlled, said remote location being in a living space where said stored water is to be used.

2. An electronic water heating system controller according to claim 1 wherein said operating means comprises:
   (a) timer means for controlling the time of day and/or the duration of time that said energizing means will energize said water heating system, and
   (b) selecting means for activating said energizing means directly or through said timer means so that said water heating system is operating in accordance with one of said plurality of operating modes.

3. An electronic water heating system controller according to claims 1 or 2 wherein said operating means include means for operating said water heating system automatically for a pre-selected duration of time at least one pre-selected hour every day.

4. An electronic water heating system controller according to claims 1 or 2 wherein said operating means includes means for operating said water heating system for a selected duration of time on command.

5. An electronic water heating system controller according to claims 1 or 2 wherein said operating means includes means for operating said water heating system continuously on command.

6. An electronic water heating system controller for remotely controling a water heater comprising:
   (a) a power module comprising switching means for energizing and de-energizing a water heating system, said power module being normally disabled,
   (b) a temperature sensor positioned at the top of a water storage tank of said water heating system actually measuring the temperature of water stored at the top of said water storage tank, so that the actual temperature of the hottest water of all water stored in said storage tank is measured,
   (c) at least one control console comprising:
      (1) means driven by said temperature sensor for displaying said actual temperature of said hottest water at the top of said water storage tank, so that a determination of whether sufficient hot water is available for a selected one of a plurality of tasks can be made, said plurality of tasks requiring a plurality of water temperatures for their performance,
      (2) timer means for controlling the time of day and/or the duration of time that said switching means will energize said water heating system, and
      (3) selecting means for activating said switching means directly or through said timer means so that said water heating system is operated in accordance with one of a plurality of operating modes, selection of one of said plurality of operating modes being based on said actual temperature measurement, and
   (d) means for interconnecting said temperature sensor to said actual temperature displaying means, and said selecting means and said timer means to said switching means so that said actual temperature displaying means and said selecting means and said timer means can be remotely located from said water heating system, said remote location being in a living space where said stored water is to be used.

7. An electronic water heating system controller according to claims 1, 2 or 6 wherein said water heating system is electric powered and wherein said energizing means comprises means for switching on and off the flow of current to a heating coil of said water heating system.

8. An electronic water heating system controller according to claims 1, 2 or 6 wherein said water heating system is gas fueled and wherein said energizing means comprises means for switching on and off the flow of gas to a gas burner of said water heating system.

9. An electronic water heating system controller according to claims 1 or 2 further comprising:
 (a) second means for actually measuring the temperature of water stored at the top of a preheat tank heated by solar energy, so that the actual temperature of the hottest water stored in said preheat tank is measured,
 (b) second means for displaying the actually measured temperature of said water stored at the top of said preheat tank driven by said second actual temperature measuring means, and
 (c) bypass means for allowing water to be drawn directly from the top of said preheat tank or for causing water to flow into the bottom of said water storage tank for additional heating, by said water heating system.

10. An electronic water heating system controller according to claim 9 wherein said bypass means comprises valve means for diverting the flow of said water activated by said operating means.

11. An electronic water heating system controller according to claims 1 or 2 further comprising means for remotely adjusting the operating temperature of said water heating system.

12. An electronic water heating system controller according to claim 6, further comprising:
 (a) second means for actually measuring the temperature of water stored at the top of a solar preheat tank, so that the actual temperature of the hottest water of all water stored in said solar preheat tank is measured, and
 (b) means for directing the flow of hot water directly from the top of said solar preheat tank when the actual measured temperature of the water stored in said preheat tank is sufficiently hot and for causing said hot water to flow into the bottom of said water storage tank for additional heating when the actual measured temperature of the water stored in said preheat tank is insufficiently hot.

13. An electronic water heating system controller according to claim 12 wherein said control console further comprises:
 (a) second means for displaying the actually measured temperature of said water stored at the top of said preheat tank driven by said second actual temperature measuring means, and
 (b) means for activating said directing means when one of said plurality of operating modes is selected.

14. An electronic domestic water heater system controller comprising:
 (a) a power module comprising switching means for energizing and de-energizing a domestic water heating system,
 (b) first means for continuously measuring the temperature of water stored in a water storage tank of said domestic water heating system,
 (c) second means for continuously measuring the temperature of water stored in a solar preheat tank connected to said storage tank,
 (d) means for directing the flow of water directly from said solar preheat tank into the hot water distributing system and by-passing said water storage tank when the temperature of the water stored in said solar preheat tank is determined to be sufficiently hot and for causing said water from said solar preheat tank to flow into said water storage tank for additional heating when the temperature of such water is determined to be insufficient,
 (e) at least one control console comprising:
  (1) first means driven by said first measuring means for continuously displaying said water temperature measurement of said water stored in said water storage tank,
  (2) second means driven by said second measuring means for continuously displaying said water temperature measurement of said water stored in said solar preheat tank,
  (3) means for activating said solar preheated water directing means,
  (4) timer means for controlling the time of day and/or the duration of time that said switching means will energize said water heating system,
  (5) selecting means for activating said switching means directly or through said timer means so that said water heating system is operated in accordance with one of a plurality of operating modes, and
 (f) means for interconnecting said first water temperature measuring means to said first displaying means, for interconnecting said second water temperature measuring means to said second displaying means, for interconnecting said solar preheated water directing means and means for activating said directing means, and for interconnecting said selecting means and said timer to said switching means so that said first and said second displaying means, said means for activating said solar preheated water directing means, said selecting means and said timer means can be remotely located from said water storage tank and said solar preheat tank.

15. An electronic water heating system controller according to claim 14 wherein said selecting means indirectly activates said switching means through said timer means in accordance with two of said plurality of operating modes so that said water heating system is operated either automatically at at least one preselected hour every day for a pre-selected duration of time, or operated on command for a selected duration of time.

16. An electronic water heating system control according to claim 15 wherein said selecting means directly activates said switching means in accordance with one of said plurality of operating modes so that said water heating system is operated continuously on command.

17. A method for remotely controlling the operation of a water heating system comprising:
 (a) actually measuring the temperature of water stored at the top of a storage tank of the water heater system, so that the actual temperature of the hottest water of all water stored in said storage tank is measured, (b) displaying at a remote location said actual water temperature measurement, so that a determination of whether sufficient hot water is available for a selected one of a plurality of tasks can be made, said plurality of tasks requiring a plurality of water temperatures for their performance, said remote location being in a living space where said stored water is to be used, (c) determining from the actual water temperature measurement display of said hottest water temperature whether additional hot water is required, and if it is (d) selecting one of a plurality of operating modes to obtain heated water either continuously or for at least one pre-selected hour each day and/or for a pre-selected duration, and (e) energizing from said remote location the water heating system in accordance with a selected operating mode, said water heating system being normally disabled.

18. A method of remotely controlling the operation of a water heating system normally drawing water directly from a solar preheat tank and using a conventionally fueled water heater as a back-up comprising:

(a) actually measuring the temperature of water stored at the top of the solar preheat tank, so that the actual temperature of the hottest water of all water stored in said solar preheat tank is measured, (b) displaying at a remote location the actual temperature measurement of the water stored at the top of the solar preheat tank, said remote location being in a living space where said stored water is to be used, (c) measuring the actual temperature of water stored at the top of a storage tank of a conventionally fueled water heater, so that the actual temperature of the hottest water of all water stored in said storage tank is measured, (d) displaying at said remote location the fueled water heater actual water temperature measurement of the hottest water stored at the top of the tank, so that a determination can be made of whether sufficient hot water is available for a selected one of a plurality of tasks, said plurality of tasks requiring a plurality of water temperatures for their performance, (e) determining whether the displayed temperature of the hottest water stored in the solar preheat tank is sufficiently hot for a selected task, and if it is not sufficiently hot for said task, (f) selecting one of a plurality of operating modes so that water from the top of said solar preheat tank is fed into the bottom of said conventionally fueled water heater for additional heating either continuously or at a pre-selected time and/or for a pre-selected duration, and (g) energizing from said remote location said conventionally fueled water heater in accordance with said selected operating mode, said conventionally fueled water heater being normally disabled.

19. A method of controlling a water heating system according to claims 17 or 18 further comprising means for remotely adjusting the temperature setting to which said water heating system will heat water stored therein.

20. A method of controlling the operation of a water heating system according to claims 17 or 18 wherein said plurality of operating modes comprises:

(a) operating said water heating system automatically at at least one pre-selected hour every day, for a pre-selected duration of time, (b) operating said water heating system for a selected duration of time on command, and (c) operating said water heating system continuously on command.

21. An electronic water heating system controller for controlling a water heater from a location remote from the water heating comprising:

(a) a temperature sensor positioned at the top of a water storage tank of the water heating system actually measuring the temperature of water stored at the top of said water storage tank, so that the actual temperature of the hottest water of all water stored in said storage tank is measured, (b) means driven by said temperature sensor for displaying the actual measured temperature of said hottest water at a location remote from said storage tank, so that a determination of whether sufficient hot water is available for a selected one of a plurality of tasks can be made, said plurality of tasks requiring a plurality of water temperatures for their performance, said remote location being in a living space where said stored water is to be used, (c) means at said remote location for operating the water heating system at said storage tank, (d) means activated by said remote operating means for energizing the water heating system at said tank, said energizing means being normally disabled, and (e) means interconnecting said temperature sensor with said actual temperature displaying means at said remote location and means interconnecting said energizing means with said remote operating means, said sensed temperature display means and said means interconnecting said energizing means with said remote operating means allowing the temperature of the water stored in said system to be controlled at said remote operating means on the basis of the actual water temperature of the hottest water stored in said storage tank displayed at said actual temperature display means.

22. An electronic water heating system controller comprising:

(a) a power module comprising switching means for energizing and de-energizing a water heating system, (b) means for actually measuring the temperature of water stored at the top of a water storage tank of said water heater system, so that the actual temperature of the hottest water of all water stored in said storage tank is measured, (c) second means for actually measuring the temperature of water stored at the top of a solar preheat tank, so that the actual temperature of the hottest water of all water stored in said solar preheat tank is measured, (d) means for directing the flow of hot water directly from the top of said solar preheat tank when the actual measured temperature of the water stored in said preheat tank is sufficiently hot and for causing said hot water to flow into the bottom of said water storage tank for additional heating when the actual measured temperature of the water stored in said preheat tank is insufficiently hot, (e) at least one control console comprising:

(1) means driven by said measuring means for displaying said actual water temperature measurement of said hottest water at the top of said water storage tank, so that a determination of whether sufficient hot water for a selected task is available can be made, (2) timer means for controlling the time of day and/or the duration of time that said switching means will energize said water heating system, (3) selecting means for activating said switching means directly or through said timer means so that said water heating system is operated in accordance with one of a plurality of operating modes, (4) second means for displaying the actually measured temperature of said water stored at the top of said preheat tank driven by said second actual temperature measuring means, and (5) means for activating said directing means when one of said plurality of operating modes is selected, (f) means for interconnecting said actual temperature measuring means to said actual temperature displaying means, and said selecting means and said timer means to said switching means so that said actual temperature displaying means and said selecting means and said timer means can be remotely located from said water heating system, and (g) means for interconnecting said second actual water temperature measuring means to said second actual temperature displaying means and said diverting means to said activating means so that said second actual temperature displaying means and said activating means can be remotely located from said water heating system.

23. An electronic water heating system controller according to claim 22 wherein said selecting means indirectly activates said switching means through said timer means in accordance with two of said plurality of operating modes so that said water heating system is operated either automatically at at least one preselected hour every day for a pre-selected duration of time, or operated on command for a selected duration of time.

24. An electronic water heating system controller according to claim 23 wherein said selected means directly activates said switching means in accordance with one of said plurality of operating modes so that said water heating system is operated continuously on command.

25. An electronic water heating system controller according to claims 1, 6 or 21 wherein said actual temperature measuring means measuring the actual temperature of the water stored at the top of said storage tank is a temperature sensor attached to a water outlet pipe for drawing water from the top of said storage tank at a point substantially adjacent the top of said storage tank.

26. A method of controlling the operation of a water heating system according to claims 17 and 18 wherein the step of measuring the actual temperature of the hottest water stored at the top of said storage tank is performed using a temperature sensor attached to a water outlet pipe for drawing water from the top of said storage tank at a point substantially adjacent the top of said storage tank.

27. An electronic water heating system controller according to claim 6 wherein said selecting means indirectly activates said switching means through said timer means in accordance with two of said plurality of operating modes so that said water heating system is operated either automatically at at least one preselected hour every day for a pre-selected duration of time, or operated on command for a selected duration of time.

28. An electronic water heating system controller according to claim 27 wherein said selected means directly activates said switching means in accordance with one of said plurality of operating modes so that said water heating system is operated continuously on command.

* * * * *